US012789789B2

(12) United States Patent
Cherukumilli et al.

(10) Patent No.: US 12,789,789 B2
(45) Date of Patent: Nov. 10, 2026

(54) VEHICLE PARKING SENSOR SYSTEM FOR AUTOMATIC TIRE ORIENTATION ON A SLOPED ROADWAY

(71) Applicant: Valeo Schalter und Sensoren GmbH, Bietigheim-Bissingen (DE)

(72) Inventors: Kiran Cherukumilli, San Mateo, CA (US); Deep Doshi, San Mateo, CA (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 141 days.

(21) Appl. No.: 18/802,896

(22) Filed: Aug. 13, 2024

(65) Prior Publication Data

US 2026/0048733 A1 Feb. 19, 2026

(51) Int. Cl.

*B60W 30/06* (2006.01)
*B60W 10/18* (2012.01)
*B60W 10/20* (2006.01)
*B60W 50/14* (2020.01)

(52) U.S. Cl.

CPC .......... *B60W 30/06* (2013.01); *B60W 10/182* (2013.01); *B60W 10/20* (2013.01); *B60W 50/14* (2013.01); *B60W 2050/146* (2013.01); *B60W 2552/15* (2020.02); *B60W 2710/207* (2013.01)

(58) Field of Classification Search

CPC .... B60W 30/06; B60W 10/182; B60W 10/20; B60W 50/14; B60W 2050/146; B60W 2552/15; B60W 2710/207

See application file for complete search history.

(56) References Cited

U.S. PATENT DOCUMENTS

| | | | | |
|---|---|---|---|---|
| 9,114,834 | B2 | 8/2015 | Hauber | |
| 10,525,881 | B1 | 1/2020 | Deshpande et al. | |
| 2017/0291601 | A1* | 10/2017 | Kim | B60W 10/20 |
| 2021/0039633 | A1* | 2/2021 | Seo | B60W 30/06 |
| 2021/0103896 | A1* | 4/2021 | Diehl | B60W 30/10 |
| 2021/0339736 | A1* | 11/2021 | McKnew | B60W 30/06 |
| 2022/0379960 | A1* | 12/2022 | Salter | B60L 53/50 |
| 2024/0109538 | A1* | 4/2024 | Park | B60W 10/08 |
| 2024/0317215 | A1* | 9/2024 | Okabe | B60R 1/22 |

* cited by examiner

*Primary Examiner* — Mohamed Barakat

(74) *Attorney, Agent, or Firm* — Valeo Schalter und Sensoren GmbH

(57) ABSTRACT

A method for automatically parking a vehicle on a sloped roadway. The method detects a roadway slope gradient, utilizing at least one vehicle sensor, at a roadway where the vehicle is presently located. The method calculates at least one vehicle slope value responsive to the detected slope gradient and a validation threshold over a period of time. The method instructs, using a vehicle controller, a plurality of vehicle tires to turn in a direction according to the at least one vehicle slope value. The method applies a parking brake to the vehicle, using the vehicle controller. The method sends an acknowledgement notification, using the vehicle controller, to inform a user of the vehicle.

18 Claims, 6 Drawing Sheets

VEHICLE PARKING SENSOR SYSTEM FOR AUTOMATIC TIRE ORIENTATION ON A SLOPED ROADWAY

TECHNICAL FIELD

The present invention relates to automated vehicle tire turning system to be utilized with a parked vehicle and a sloped roadway.

BACKGROUND OF THE INVENTION

The invention relates to the field of detecting the gradient of a slopped roadway for parking a vehicle, in order to automatically turn the vehicle tires. When parking on a downhill/uphill sloped roadway with adjacent pedestrian sidewalk, parking regulations require a driver to turn vehicle tires accordingly toward the adjacent sidewalk to prevent the vehicle from rolling into the roadway in case of vehicle brakes failure. Currently, commercially available automated vehicle parking systems do not comply with this parking regulation by turning vehicle tires toward the adjacent sidewalk at the completion of a parking maneuver, so a proper vehicle parking system is needed to automatically turn vehicle tires away from the sloped roadway when parking on a respective downhill/uphill slope and automatically turn vehicle tires toward the adjacent sidewalk.

SUMMARY OF THE INVENTION

A method for automatically parking a vehicle on a sloped roadway. The method includes detecting a roadway slope gradient, utilizing at least one vehicle sensor, at a roadway where the vehicle is presently located. The method further includes calculating at least one vehicle slope value responsive to the detected slope gradient and a validation threshold over a period of time. The method additionally includes instructing, using a vehicle controller, a plurality of vehicle tires to turn in a direction according to the at least one vehicle slope value. The method moreover includes applying a parking brake to the vehicle, using the vehicle controller. The method further includes sending an acknowledgement notification, using the vehicle controller, to inform a user of the vehicle.

A vehicle control system for automatically parking a vehicle on a sloped roadway. The vehicle control system includes one or more vehicle sensors configured to detect a roadway slope gradient at a roadway where the vehicle is presently located. The vehicle control system further includes a vehicle controller configured to calculate at least one vehicle slope value responsive to the detected slope gradient and a validation threshold over a period of time. The vehicle control system additionally includes a vehicle controller configured to instruct a plurality of vehicle tires to turn in a direction according to the at least one vehicle slope value. The vehicle control system moreover includes a vehicle controller configured to apply a parking brake to the vehicle. The vehicle control system further includes a vehicle controller configured to send an acknowledgement notification to inform a user of the vehicle.

A processor configured to execute instructions stored on a non-transitory computer-readable medium. The processor, executing the instructions, includes detecting a roadway slope gradient, utilizing at least one vehicle sensor, at a roadway where the vehicle is presently located. The processor, executing the instructions, further includes calculating at least one vehicle slope value responsive to the detected slope gradient and a validation threshold over a period of time. The processor, executing the instructions, additionally includes instructing, using a vehicle controller, a plurality of vehicle tires to turn in a direction according to the at least one vehicle slope value. The processor, executing the instructions, moreover includes applying a parking brake to the vehicle, using the vehicle controller. The processor, executing the instructions, further includes sending an acknowledgement notification, using the vehicle controller, to inform a user of the vehicle.

The foregoing elements and features can be combined in various combinations without exclusivity, unless expressly indicated otherwise. These elements and features, as well as the operation thereof, will become more apparent in view of the following detailed description with accompanying drawings. It should be understood that the following detailed description and accompanying drawings are intended to be exemplary in nature and non-limiting.

BRIEF DESCRIPTION OF DRAWINGS

The embodiments of the present disclosure are pointed out with particularity in the appended claims. Various other features will become more apparent to those skilled in the art from the following detailed description of the disclosed non-limiting embodiments and will be best understood by referring to the following detailed description along with the accompanying drawings in which:

DETAILED DESCRIPTION OF THE INVENTION

Figure 1:
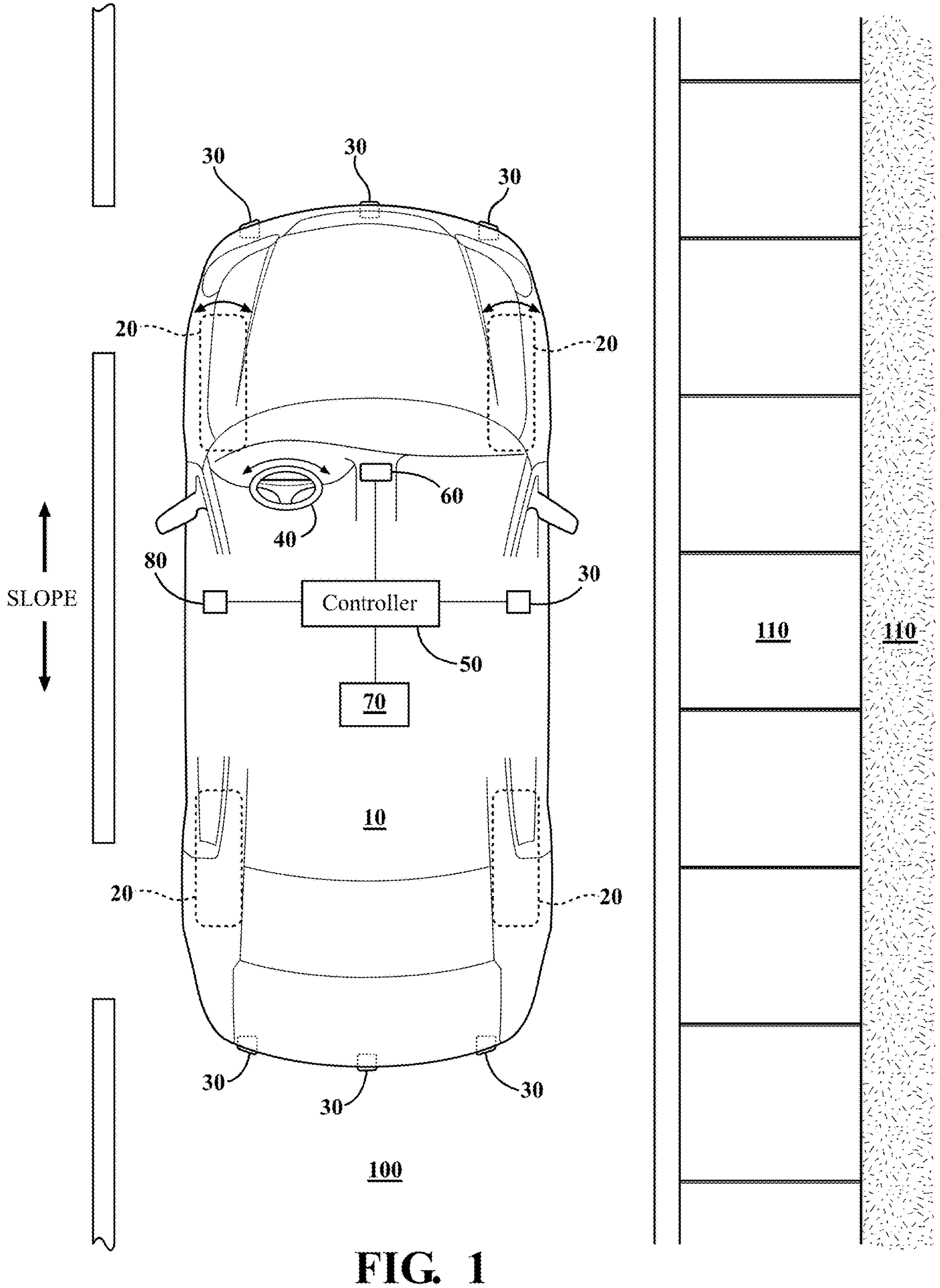
FIG. 1 illustrates a vehicle parked on a sloped roadway adjacent to non-roadway terrain.

Detailed embodiments of the present invention are disclosed herein. It is to be understood that the disclosed embodiments are merely examples of the invention that can be embodied in various and alternative forms. The Figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features described and illustrated with reference to any one of the Figures can be combined with features illustrated in one or more other Figures to produce embodiments that are not explicitly described or illustrated. The combinations of features illustrated provide representative embodiments for typical applications. However, various modifications and combinations of the features consistent with the teachings of this disclosure can be desired for particular applications or implementations.

"A", "an", and "the" as used herein refers to both singular and plural referents unless the context clearly dictates otherwise. By way of example, "a NAME" refers to one NAME or more than one NAME.

Currently, there is an issue with parking a vehicle of a roadway that has a slope incline/decline, as the tires of the parked vehicle need to be turned away from the roadway according to the direction of the sloped roadway (eg: uphill, downhill) so that if the brakes of the parked vehicle happen to malfunction, then the vehicle will not roll into the roadway, thus avoiding potential vehicle accident or damage/harm in the roadway. In one embodiment, current automated vehicle parking systems complete the following steps: 1) check for available parking slots, 2) offer finalized slots for driver selection, 3) path planning & automatic park maneuver start, 4) path tracking & continuous monitoring, 5) vehicle stops in a slot & maneuver complete, 6) automatic parking complete indication to driver.

In one embodiment, if the tires of the parked vehicle on a sloped roadway are turned toward the roadway and oncoming traffic, then during a potential vehicle brake malfunction or failure, the parked vehicle will roll into the oncoming traffic or roll into the roadway. However, if the tires of the parked vehicle on a sloped roadway are turned away from the roadway and oncoming traffic, and turned toward the adjacent sidewalk or non-roadway terrain (eg: grass, median, etc), then during a potential vehicle brake malfunction or failure, the parked vehicle will not roll into the oncoming traffic or into the roadway.

In one embodiment, while the vehicle is in the final parking location destination on a slopped roadway, the vehicle will turn the steering wheel leftward or rightward as it related to the priority order of 1) parked vehicle on left/right side of the roadway, and 2) the slope of the roadway in which the vehicle is parked at. No actions are need by the vehicle driver as the tire turning function is automatic for the parking functionality, and the driver is informed once all the parking action are complete. Multiple sensor inputs are available to calculate the roadway slope angle (eg: inclination or declination), where inputs from multiple different sensors can be fused to calculate the roadway slope angle.

In another embodiment, the vehicle tire turning direction is indirectly obtained from the driver's parking slot selection direction during an automated parking maneuver. During the automated parking maneuver, the driver will select an available parking spot (eg: parallel parking spot on a sloped roadway), then from the selection, the vehicle sensor system will obtain the current tire angle and turn the vehicle tires maximum after determining the direction towards which the tires need to be turned.

In yet another embodiment, just before completing the automatic vehicle parking maneuver, the vehicle sensor system will automatically detect & analyze roadway slope gradient where the vehicle is currently being parked by using at least one sensor of, but not limited to, a precise longitudinal accelerometer, an inertial measurement unit (IMU), a comparison of slope attribute terrain from map data, a radar, a lidar, and a fusion of some/all sensor input. If analyzed roadway slope gradient is above a certain threshold percentage (eg: +3% if uphill) or below a certain threshold (eg: −3% if downhill), then the vehicle sensor system will instruct latitudinal controller to turn the vehicle tires accordingly (eg: turn left if uphill, turn right if downhill, turn right if uphill, turn left if downhill). Also, an arithmetic mean is computed on roadway slope gradient values for a certain duration to avoid false positives or abnormal spike values. Lastly, the left/right direction towards which the vehicle tires need to turn can be obtained via the finalized slots for driver selection. Furthermore, but not limited to, during the automated parking process, the vehicle sensor system can calculate the roadway slope gradient via the precise longitudinal accelerometer or the IMU, then compute Arithmetic Mean (AM) to decide if the vehicle tires need to be turned in a certain direction: 1) if the AM is greater than or equal to the defined threshold, then extract the direction in which the vehicle tires need to be turned at the final parking spot selection by the driver, send "to turn" and "direction of turn" commands to the latitudinal controller, as well as send the completion acknowledgement to the vehicle driver once the tires are done turning the left/right direction; or 2) if the AM is less than the defined threshold, then send a signal to the latitudinal controller to apply the vehicle parking brake and send an automatic "parking complete"indication to the vehicle driver.

FIG. 1 depicts a vehicle 10 parked on a sloped roadway 100 adjacent to non-roadway terrain 110. The non-roadway terrain 110 can be, but is not limited to, a pedestrian sidewalk, a grass area, a curb, a median, or any equivalent area nearby a roadway. The vehicle 10 can be equipped with tires 20, at least one sensor 30, a steering wheel 40, a controller 50, a display 60, a parking brake 70, and a latitudinal controller 80. The tires 20 are two fixed rear tires and two turnable front tires, where the two front tires can turn or rotate in the leftward or rightward directions. The at least one sensor 30 can be, but is not limited to, a precise longitudinal accelerometer, an inertial measurement unit (IMU), a global positioning system (GPS), a comparison of slope attribute terrain from map data, a radar, a lidar, a camera, a video recording device, an equivalent device thereof, or a fusion of two or more sensor inputs with geospatial data. The steering wheel 40 can be connected in communication with and can control the leftward or rightward turning direction of the tires 20. The controller 50 can be connected in communication with the at least one sensor 30, the steering wheel 40, the display 60, and the parking brake 70. The controller 50 can be connected in communication with the latitudinal controller 80. The controller 50 can control the steering wheel 40 and can, in turn, control the leftward or rightward turning direction of the tires 20 via the latitudinal controller 80. The controller 50 can control the application of the parking brake 70. The controller 50 can receive input data from the at least one sensor 30, to then send signals to the steering wheel 40 via the latitudinal controller 80 to turn the tires 20 in a leftward or rightward direction, to then send a signal to the parking brake 70 to engage (eg: lock vehicle in parked position), to then send an information notification to the display 60 (eg: a tire notice that the plurality of vehicle tires were turned, a brake notice that the parking brake is active, etc). In another embodiment, a shift-by-wire or drive-by-wire can be connected in communication with the at least one sensor 30, the steering wheel 40, the display 60, and the parking brake 70. The shift-by-wire or drive-by-wire can be connected in communication with the latitudinal controller 80. The shift-by-wire or drive-by-wire can control the steering wheel 40 and can, in turn, control the leftward or rightward turning direction of the tires 20 via the latitudinal controller 80. The shift-by-wire or drive-by-wire can control the application of the parking brake 70. The shift-by-wire or drive-by-wire can receive input data from the at least one sensor 30, to then send signals to the steering wheel 40 via the latitudinal controller 80 to turn the tires 20 in a leftward or rightward direction, to then send a signal to the parking brake 70 to engage (eg: lock vehicle in parked position), to then send an information notification to the display 60 (eg: a tire notice that the plurality of vehicle tires were turned, a brake notice that the parking brake is active, etc). In one embodiment, but not limited to, geospatial data can be data that includes information related to a location or locations of the Earth's surface.

The at least one sensor 30 can be located on the exterior or interior of the vehicle 10. The at least one sensor 30 can located on the exterior of the vehicle 10 at the front section, side section, rear section, corner section, or combination thereof. Thus, multiple sensors 30 can be located at multiple different sections on the exterior of the vehicle 10. The at least one sensor 30 of vehicle 10 can be utilized to detect a slope gradient of the roadway 100 where the vehicle 10 can be located. Furthermore, at least one sensor 30 of vehicle 10 can be utilized to detect if the location of vehicle 10 can be next to, nearby, or adjacent to the non-roadway terrain 110; meaning a sensor 10, such as a camera, GPS, lidar, radar or combination thereof, can perceive or identify that non-roadway terrain 110 can be located next to the vehicle 10 where the sensor 10 can be located on.

Figure 2:
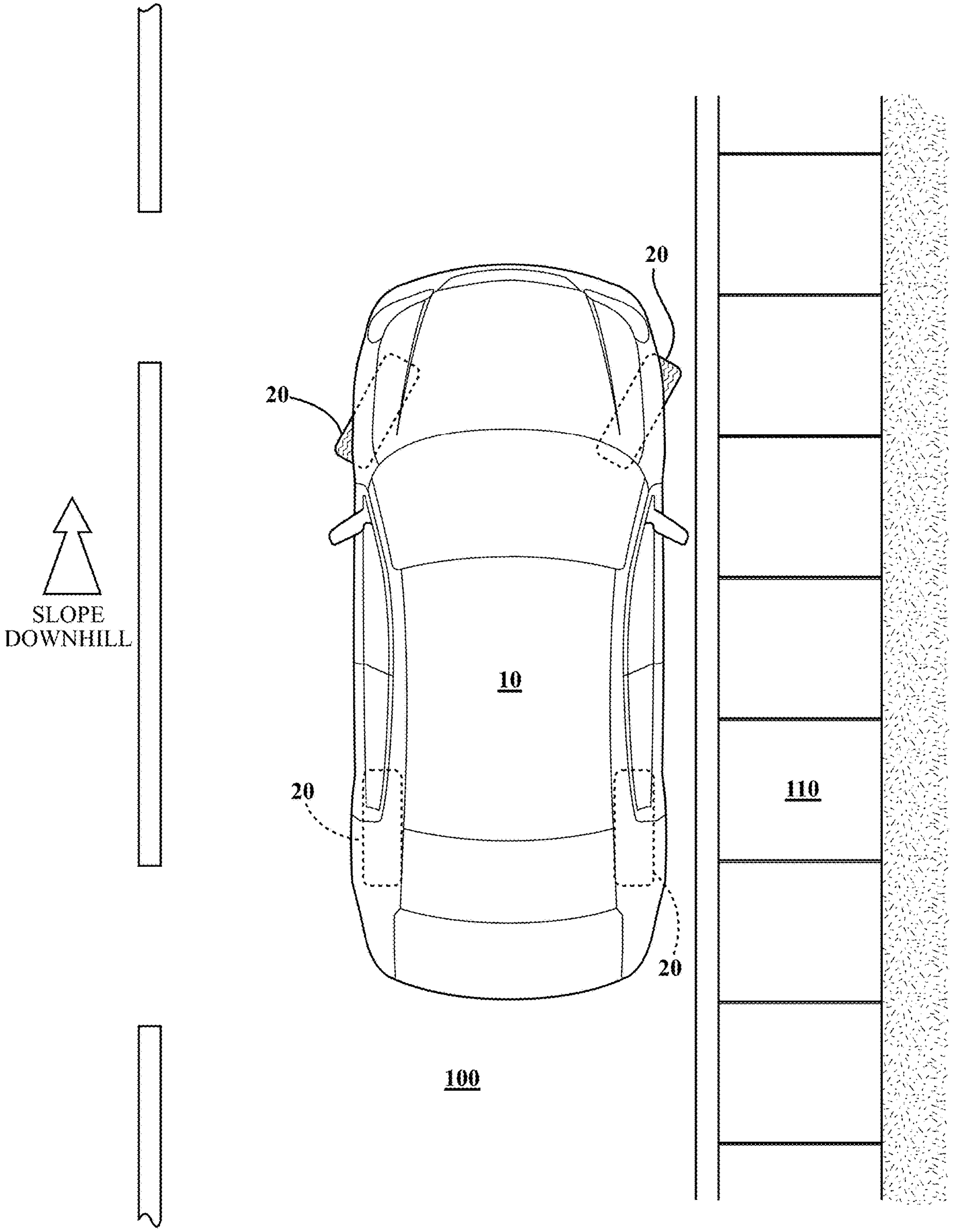
FIG. 2 illustrates a vehicle parked on a downhill sloped roadway with the vehicle tires turned toward the adjacent non-roadway terrain.

FIG. 2 depicts a vehicle 10 parked on a downhill sloped roadway 100 with the vehicle tires 20 turned toward the adjacent non-roadway terrain 110. The at least one sensor 30 detects if the vehicle 10 is parking on a sloped roadway (eg: uphill, inclined), then the input of sensor 30 can be communicated to the controller 50, so the controller 50 can communicate to the steering wheel 40 to automatically turn the tires 20 in the rightward direction facing toward the adjacent non-roadway terrain 110 and facing away from the roadway 100. Upon completion of the parking maneuver and tires 20 being completely turned accordingly as aforementioned, then the controller 50 communicates with the parking brake 70 in engage and lastly communicates with the display 60 to provide a notification indication to the vehicle user (eg: driver) that the vehicle 10 can be parked (eg: visual aid message of "parking complete" or "tires turned" or "parking brake active" or "parking brake applied", etc). Thus, the steering wheel 40 can be automatically instructed by the controller 50 to turn the vehicle tires 20 in a maximum rightward direction according to the at least one sensor 30 detecting the downhill slope gradient of the roadway 100 and the location of the non-roadway terrain 110 in relation to the vehicle 10. Therefore, due to the parked vehicle tires rightward orientation in relation to the sloped roadway and non-roadway terrain, in the event of a parking brake malfunction or the vehicle for-some-reason rolling along the sloped roadway, the vehicle will then roll towards (or into) the non-roadway terrain and not into the roadway to cause potential harm and danger to pedestrians and other vehicles nearby.

In one embodiment, but not limited to, when the vehicle 10 is located on a roadway 100 with a slope greater than two percent (2%), the vehicle sensor system, such as the controller 50 or the least one sensor 30, will detect that geospatial data and at least one vehicle slope value so the tires 20 can automatically turn in a leftward or rightward direction during the parking maneuver as aforementioned. The detected vehicle slope greater than two percent (2%) can be a positive number or an upward direction, as well as can be a negative number or a downward direction. The at least one vehicle slope value can be a positive number or an upward direction, as well as can be a negative number or a downward direction. Furthermore, the vehicle sensor system, such as the controller 50 or the least one sensor 30, can compute an arithmetic mean of the slope of the roadway 100 to validate the aforementioned detected slope gradient of the roadway 100.

Figure 3:
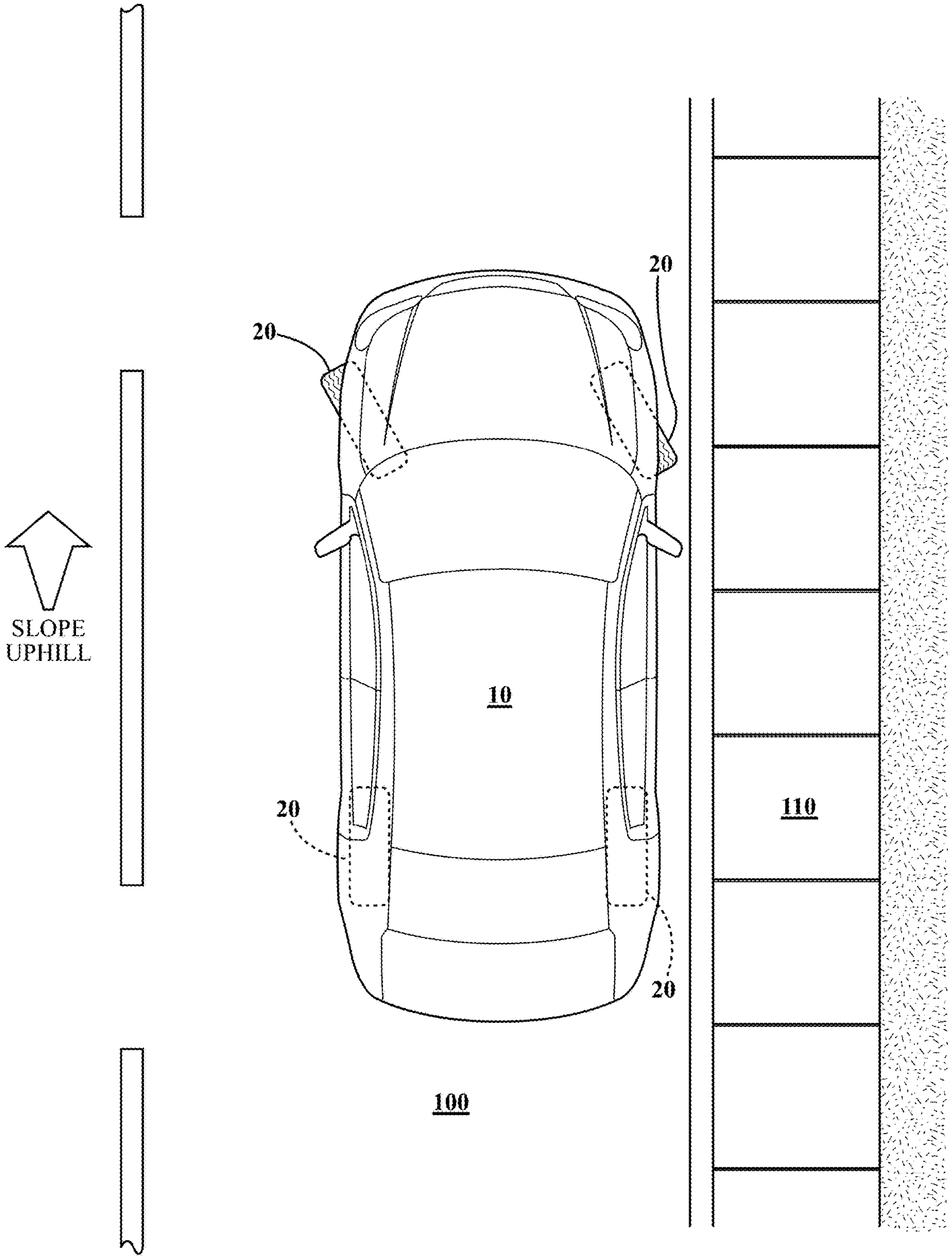
FIG. 3 illustrates a vehicle parked on an uphill sloped roadway with the vehicle tires turned away from the adjacent non-roadway terrain.

FIG. 3 depicts a vehicle 10 parked on an uphill sloped roadway 100 with the vehicle tires 20 turned away from the adjacent non-roadway terrain 100. The at least one sensor 30 detects if the vehicle 10 is parking on a sloped roadway (eg: downhill, declined), then the input of sensor 30 can be communicated to the controller 50, so the controller 50 can communicate to the steering wheel 40 to automatically turn the tires 20 in the leftward direction facing away the adjacent non-roadway terrain 110 and facing toward from the roadway 100. Upon completion of the parking maneuver and tires 20 being completely turned accordingly as aforementioned, then the controller 50 communicates with the parking brake 70 in engage and lastly communicates with the display 60 to provide a notification indication to the vehicle user (eg: driver) that the vehicle 10 can be parked (eg: visual aid message of "parking complete" or "tires turned" or "parking brake active" or "parking brake applied", etc). Thus, the steering wheel 40 can be automatically instructed by the controller 50 to turn the vehicle tires 20 in a maximum leftward direction according to the at least one sensor 30 detecting the uphill slope gradient of the roadway 100 and the location of the non-roadway terrain 110 in relation to the vehicle 10. Therefore, due to the parked vehicle tires leftward orientation in relation to the sloped roadway and non-roadway terrain, in the event of a parking brake malfunction or the vehicle for-some-reason rolling along the sloped roadway, the vehicle will then roll towards (or into) the non-roadway terrain and not into the roadway to cause potential harm and danger to pedestrians and other vehicles nearby.

Figure 4:
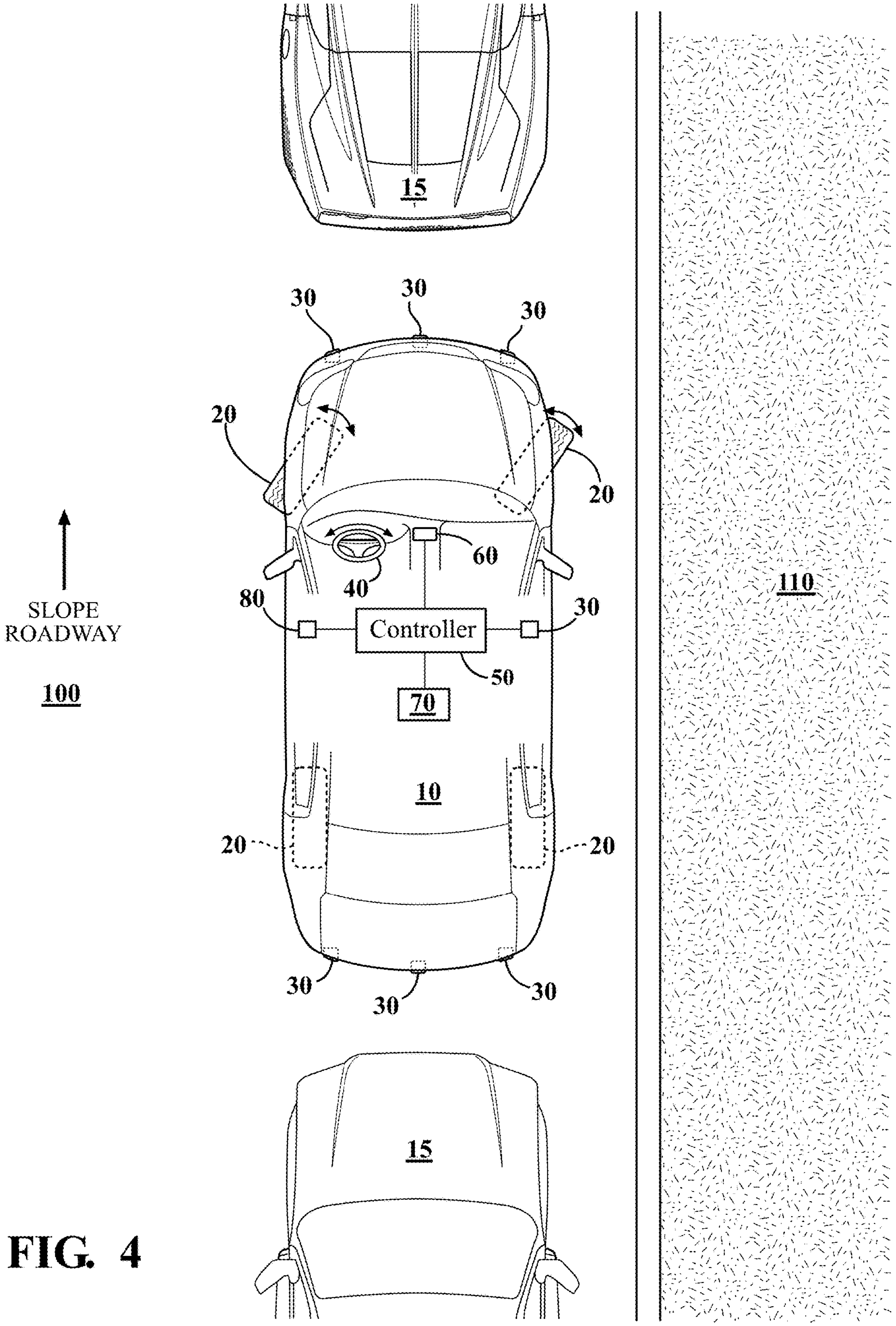
FIG. 4 illustrates a vehicle parked between other vehicles on a sloped roadway with the vehicle tires turned toward the adjacent non-roadway terrain.

FIG. 4 depicts a vehicle 10 parked between other vehicles 15 on a sloped roadway 100 with the vehicle tires 20 turned toward the adjacent non-roadway terrain 110. In one embodiment, one sensor 30 (eg: GPS) will detect that the vehicle 10 can be parked on a specific roadway 100 according to map data (eg: downhill sloped street attribute in urban city), while another sensor 30 (eg: camera) will detect that the non-roadway terrain 110 can be located on a specific side of vehicle 10 (eg: grass on right side). Then, the respective sensor 30 inputs are communicated to the controller 50 so a first command can be spend to the steering wheel 40 to automatically turn the tires 20 all the way to the right via the latitudinal controller 80, then next a second command can be sent from the controller 50 to the parking brake 70 to "engage" or "activate" once the tire 20 turning maneuver can be completed, then lastly a third command can be sent from the controller 50 to the display 60 to provide an acknowledgement notification to the vehicle user (eg: driver) informing the user that at least, but not limited to, the vehicle tires 20 were turned and the parking brake 70 can be active.

In another embodiment, one sensor 30 (eg: lidar or radar) will detect that other vehicles 15 are parked in front of and behind the vehicle 10 parking spot location, while one sensor 30 (eg: lidar or radar) will detect that the non-roadway terrain 110 can be located on a specific side of vehicle 10 (eg: grass on right side), while another sensor 30 (eg: IMU or longitudinal accelerometer) will detect the roadway 100 slope incline/decline (eg: downhill sloped street attribute in urban city). Then, the respective sensor 30 inputs are communicated to the controller 50 so a first command can be spend to the steering wheel 40 via the latitudinal controller 80 to automatically turn the tires 20 all the way to the right, then next a second command can be sent from the controller 50 to the parking brake 70 to "engage" or "activate" once the tire 20 turning maneuver can be completed, then lastly a third command can be sent from the controller 50 to the display 60 to provide an acknowledgement notification to the vehicle user (eg: driver) informing the user that at least, but not limited to, the vehicle tires 20 were turned and the parking brake 70 can be active.

Figure 5A:
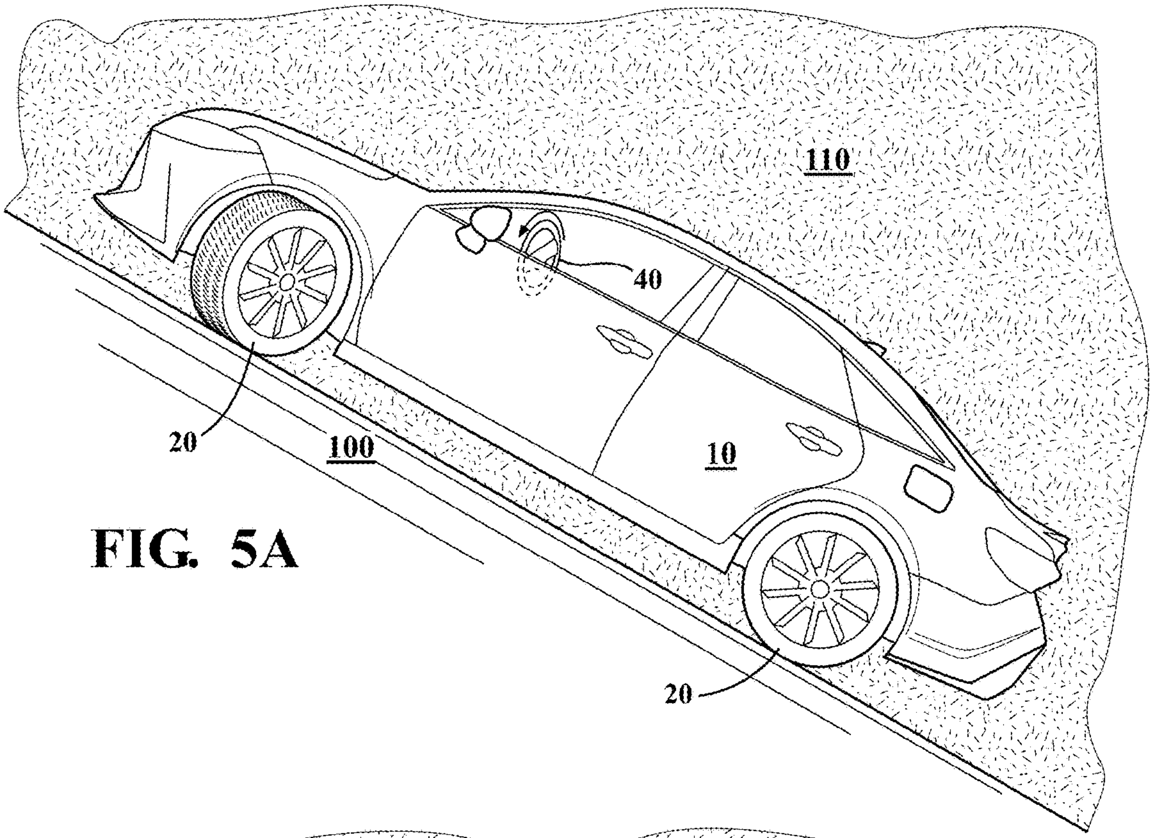
FIG. 5A and FIG. 5B illustrate a vehicle parked on a sloped roadway with the vehicle tires turned away from the roadway.
Figure 5B:
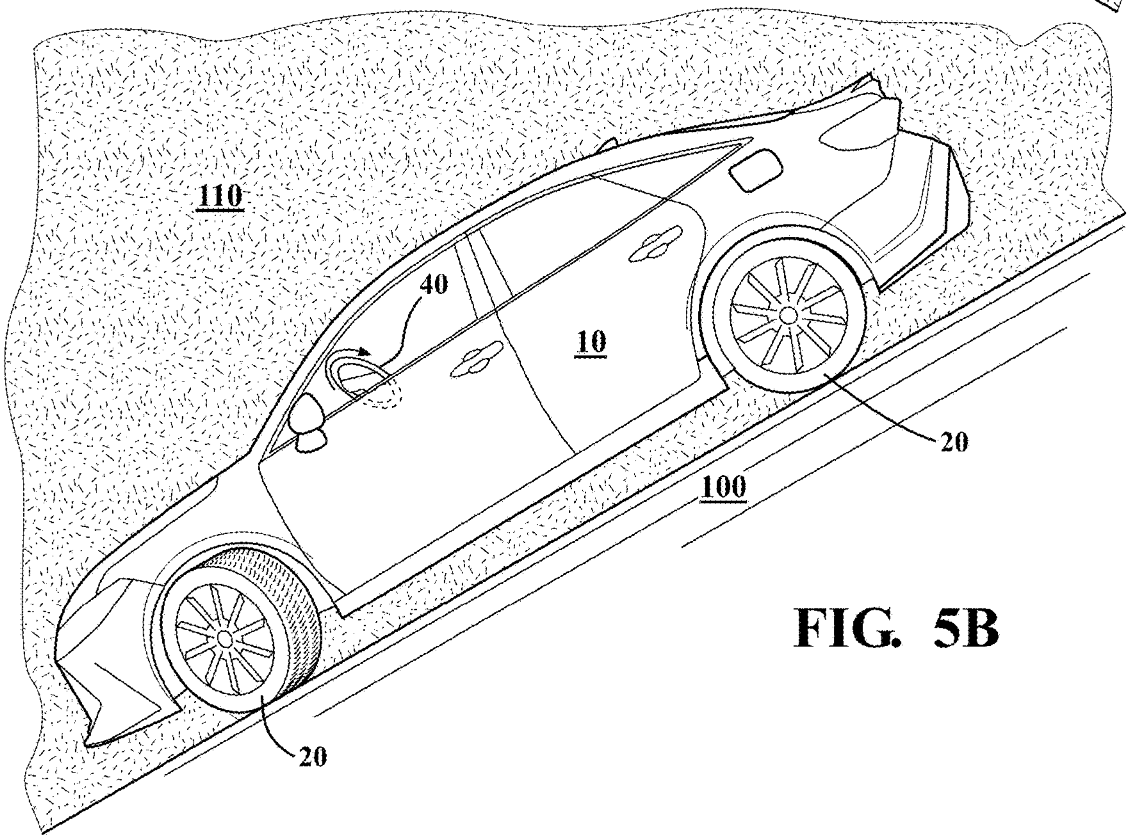

FIG. 5A and FIG. 5B depicts a vehicle 10 parked on a sloped roadway 100 with the vehicle tires 20 turned away from the roadway 100 and toward the non-roadway terrain 110. In FIG. 5A, the vehicle 10 can be parked on an uphill/incline sloped roadway 10 with the non-roadway terrain 110 to the right of the vehicle 10 and the roadway 100 to the left of the vehicle 10. Thus, the tires 20 are automatically turned to the left the maximum amount by the steering wheel 40, the latitudinal controller 80 and the controller 50 via input(s) from the at least one sensor 30. As a result, in the event of a malfunction or failure of the parking brake 70, the vehicle 10 parked on the uphill/incline sloped roadway 10 will roll into the non-roadway terrain 110 and away from the roadway 100 due to the tires 20 being automatically turned to the left.

In FIG. 5B, the vehicle 10 can be parked on a downhill/decline sloped roadway 10 with the non-roadway terrain 110 to the right of the vehicle 10 and the roadway 100 to the left of the vehicle 10. Thus, the tires 20 are automatically turned to the right the maximum amount by the steering wheel 40, the latitudinal controller 80 and the controller 50 via input(s) from the at least one sensor 30. As a result, in the event of a malfunction or failure of the parking brake 70, the vehicle 10 parked on the downhill/decline sloped roadway 10 will roll into the non-roadway terrain 110 and away from the roadway 100 due to the tires 20 being automatically turned to the right. In one embodiment, but not limited to, a vehicle slope value can be positive, upward, a positive number and an upward direction. In another embodiment, but not limited to, a vehicle slope value can be negative, downward, a negative number or a downward direction.

Figure 6:
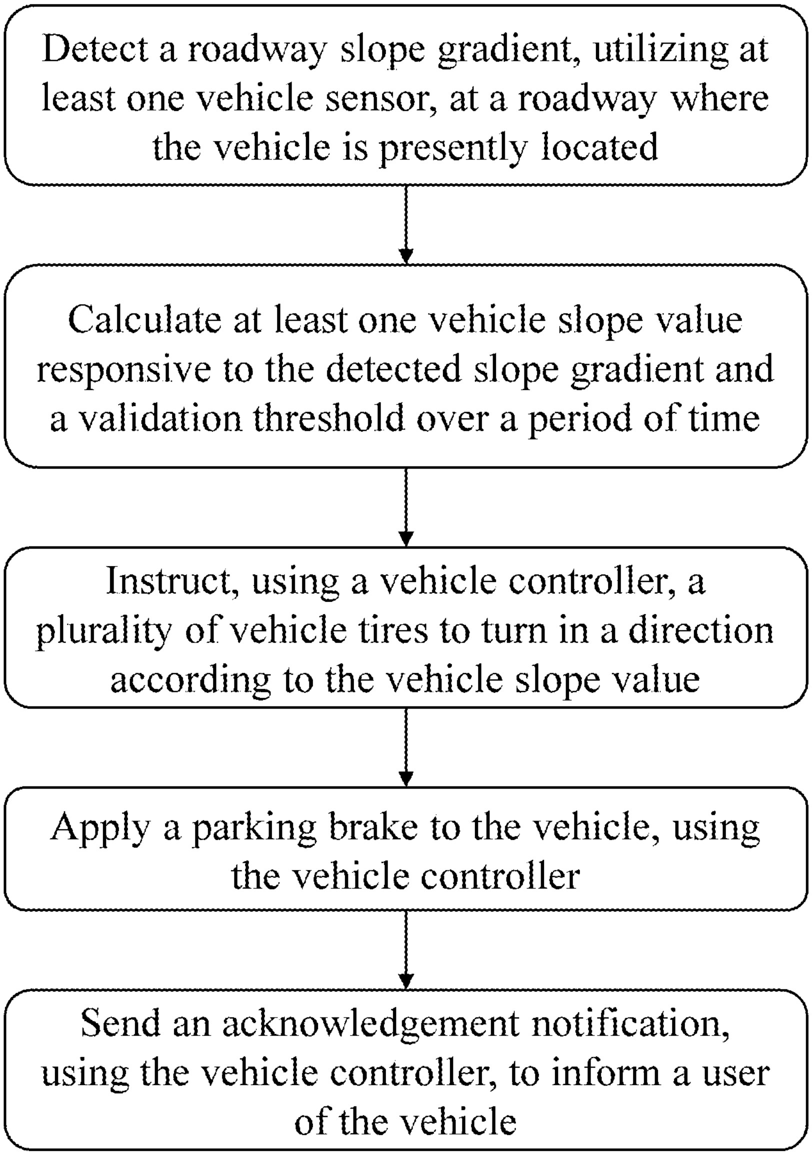
FIG. 6 illustrates an example method for automatically turning a vehicle steering wheel when a vehicle is parking on a sloped roadway.

FIG. 6 depicts an example method 600 for automatically parking a vehicle on a sloped roadway. Block 610, a roadway slope gradient can be detected, utilizing at least one vehicle sensor, at a roadway where the vehicle can be presently located. Block 620, a vehicle slope value, responsive to the detected slope gradient and a validation threshold over a period of time, can be calculated. Block 630, a plurality of vehicle tires can be instructed, using the vehicle controller, to turn in a direction according to the vehicle slope value. Block 640, a parking brake can be applied to the vehicle, using the vehicle controller. Block 650, an acknowledgement notification can be sent, using the vehicle controller, to inform a user of the vehicle.

The methods, processes, or algorithms disclosed herein can be deliverable to or implemented by a processing device, controller, or computer, which can include any existing programmable electronic control unit or dedicated electronic control unit. Also, the methods, processes, or algorithms can be implemented in a software executable object. Furthermore, the methods, processes, or algorithms can be stored as data and instructions executable by a controller or computer in many forms including, but not limited to, information permanently stored on non-writable storage media, such as ROM devices, and information alterably stored on writeable storage media, such as floppy disks, magnetic tapes, CDs, RAM devices, and other magnetic and optical media. Computing devices described herein generally include computer-executable instructions, where the instructions can be executable by one or more computing or hardware devices, such as those listed above. Such instructions and other data can be stored and transmitted using a variety of computer-readable media. Computer-executable instructions can be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.) and executes these instructions, thereby performing one or more processes, including one or more of the processes described herein. Moreover, the methods, processes, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims of the invention. While the present disclosure is described with reference to the figures, it will be understood by those skilled in the art that various changes can be made and equivalents can be substituted without departing from the scope and spirit of the present disclosure. The words used in the specification are words of description rather than limitation, and it is further understood that various changes can be made without departing from the scope and spirit of the invention disclosure. In addition, various modifications can be applied to adapt the teachings of the present disclosure to particular situations, applications, and/or materials, without departing from the essential scope and spirit thereof. Additionally, the features of various embodiments can be combined to form further embodiments of the invention that cannot be explicitly described or illustrated. While various embodiments can have been described as providing advantages or being preferred over other embodiments or prior art implementations with respect to one or more desired characteristics, those of ordinary skill in the art recognize that one or more features or characteristics could be compromised to achieve desired overall system attributes, which depend on the specific application and implementation. These attributes can include, but not limited to, strength, cost, durability, life cycle cost, appearance, marketability, size, packaging, weight, serviceability, manufacturability, ease of assembly, etc. Therefore, to the extent any embodiments are described as less desirable than other embodiments or prior art implementations with respect to one or more characteristics, these embodiments are not outside the scope of the disclosure and can be desirable for particular applications. Thus, the present disclosure is thus not limited to the particular examples disclosed herein, but includes all embodiments falling within the scope of the appended claims.

The invention claimed is:

1. A method for automatically parking a vehicle on a sloped roadway, comprising:

detecting a roadway slope gradient, utilizing at least one vehicle sensor, at a roadway where the vehicle is presently located;

calculating at least one vehicle slope value responsive to the detected slope gradient and a validation threshold over a period of time, wherein the validation threshold is greater than 2% by computing an arithmetic mean of the roadway slope gradient over a defined duration to avoid false positives, and the at least one vehicle slope value is positive or negative;

instructing, using a vehicle controller, a plurality of vehicle tires to turn in a direction according to the at least one vehicle slope value;

applying a parking brake to the vehicle, using the vehicle controller; and sending an acknowledgement notification, using the vehicle controller, to inform a user of the vehicle.

2. The method of claim 1, wherein the at least one vehicle sensor is at least one of a precise longitudinal accelerometer, an inertial measurement unit, a global positioning system, a radar, a lidar, or a combination thereof with geospatial data.

3. The method of claim 1, wherein the instructing is configured to turn the plurality of vehicle tires in a maximum leftward direction responsive to the at least one vehicle slope value being positive.

4. The method of claim 1, wherein the instructing is configured to turn the plurality of vehicle tires in a maximum rightward direction responsive to the at least one vehicle slope value being negative.

5. The method of claim 1, wherein the detecting the roadway slope gradient utilizes at least one of a precise longitudinal accelerometer, an inertial measurement unit, a radar, a lidar, or a combination thereof with geospatial data.

6. The method of claim 1, wherein the instructing, using the vehicle controller, the plurality of vehicle tires to turn includes at least a latitudinal controller.

7. The method of claim 1, further comprising computing the arithmetic mean of the roadway slope gradient for validating the detected slope gradient.

8. The method of claim 1, wherein the sending the acknowledgement notification includes (i) a tire notice that the plurality of vehicle tires were turned, (ii) a brake notice that the parking brake is active, and (iii) a confirmation notice that automatic parking is complete.

9. The method of claim 8, wherein the tire notice includes the direction the plurality of vehicle tires was turned.

10. A vehicle control system for automatically parking a vehicle on a sloped roadway, comprising:

one or more vehicle sensors configured to detect a roadway slope gradient at a roadway where the vehicle is presently located; and a vehicle controller configured to calculate at least one vehicle slope value responsive to the detected slope gradient and a validation threshold over a period of time, wherein the validation threshold is greater than 2% by computing an arithmetic mean of the roadway slope gradient over a defined duration to avoid false positives, and the at least one vehicle slope value is positive or negative;

instruct a plurality of vehicle tires to turn in a direction according to the at least one vehicle slope value;

apply a parking brake to the vehicle; and send an acknowledgement notification to inform a user of the vehicle.

11. The vehicle control system of claim 10, wherein the vehicle controller is configured to turn the plurality of vehicle tires in a maximum leftward direction responsive to the at least one vehicle slope value being positive, and to turn the plurality of vehicle tires in a maximum rightward direction responsive to the at least one vehicle slope value being negative.

12. The vehicle control system of claim 10, wherein the one or more vehicle sensors includes at least two of a precise longitudinal accelerometer, an inertial measurement unit, a global positioning system, a radar, a lidar, or a combination thereof with geospatial data.

13. The vehicle control system of claim 10, wherein the vehicle controller includes at least a latitudinal controller configured to instruct the plurality of vehicle tires to turn.

14. The vehicle control system of claim 10, further comprising the vehicle controller computes the arithmetic mean of the roadway slope gradient for validating the detected slope gradient.

15. The vehicle control system of claim 10, wherein the vehicle controller sends the acknowledgement notification including (i) a tire notice that the plurality of vehicle tires were turned, (ii) a brake notice that the parking brake is active, and (iii) a confirmation notice that automatic parking is complete.

16. The vehicle control system of claim 15, wherein the tire notice includes the direction the plurality of vehicle tires was turned.

17. The vehicle control system of claim 10, wherein the plurality of vehicle tires are turned in a leftward direction if the roadway slope gradient is upward, and the plurality of vehicle tires are turned in a rightward direction if the roadway slope gradient is downward.

18. A processor configured to execute instructions stored on a non-transitory computer-readable medium, wherein executing the instructions causes the processor to:

detect a roadway slope gradient, utilizing at least one vehicle sensor, at a roadway where the vehicle is presently located;

calculate at least one vehicle slope value responsive to the detected slope gradient and a validation threshold over a period of time, wherein the validation threshold is greater than 2% by computing an arithmetic mean of the roadway slope gradient over a defined duration to avoid false positives, and the at least one vehicle slope value is positive or negative;

instruct, using a vehicle controller, a plurality of vehicle tires to turn in a direction according to the at least one vehicle slope value;

apply a parking brake to the vehicle, using the vehicle controller; and send an acknowledgement notification, using the vehicle controller, to inform a user of the vehicle.

* * * * *